(12) United States Patent
Takabayashi et al.

(10) Patent No.: US 9,422,438 B2
(45) Date of Patent: *Aug. 23, 2016

(54) PHOTOCURABLE INKJET AND IMAGE FORMING METHOD USING SAME

(71) Applicant: Konica Minolta, Inc., Tokyo (JP)

(72) Inventors: Toshiyuki Takabayashi, Tokyo (JP); Satoshi Masumi, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 83 days.

This patent is subject to a terminal disclaimer.

(21) Appl. No.: 14/363,224

(22) PCT Filed: Dec. 10, 2012

(86) PCT No.: PCT/JP2012/007876

§ 371 (c)(1),
(2) Date: Jun. 5, 2014

(87) PCT Pub. No.: WO2013/084511

PCT Pub. Date: Jun. 13, 2013

(65) Prior Publication Data

US 2014/0333704 A1    Nov. 13, 2014

(30) Foreign Application Priority Data

Dec. 8, 2011 (JP) .................................. 2011-269458
Jan. 27, 2012 (JP) .................................. 2012-015264

(51) Int. Cl.
*B41J 2/21* (2006.01)
*C09D 11/30* (2014.01)
(Continued)

(52) U.S. Cl.
CPC .................. *C09D 11/30* (2013.01); *B41J 2/155* (2013.01); *B41J 2/2107* (2013.01); *B41J 11/002* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................... 347/95–105
See application file for complete search history.

(56) References Cited

U.S. PATENT DOCUMENTS 8,124,791 B2 * 2/2012 Shinjo .................. C09D 11/101
548/520
2006/0054040 A1 * 3/2006 Daems .................... B41C 1/003
101/463.1
(Continued)

FOREIGN PATENT DOCUMENTS

JP    2004-131725    4/2004
JP    2006-282764    10/2006
(Continued)

OTHER PUBLICATIONS

Soltech Ltd. UV tech, UV Oligomers, UV acrylate, UV Curing, Aromatic Urethane Acrylate (2010) p. 1.*
(Continued)

*Primary Examiner* — Manish S Shah
(74) *Attorney, Agent, or Firm* — Lucas & Mercanti, LLP

(57) ABSTRACT

Provided is a photocurable inkjet ink including a curable monomer, a photopolymerization initiator, a gelling agent, a colorant, and a curable oligomer. The photocurable inkjet ink is characterized in that the curable oligomer has from two to twenty functional groups, that the glass transition temperature thereof is 40.degree. C. or higher, and that the curable oligomer content is from 2 to 20% by mass relative to the mass of the ink as a whole.

15 Claims, 2 Drawing Sheets

(51) Int. Cl.
- *B41J 11/00* (2006.01)
- *B41J 2/155* (2006.01)
- *B41M 5/00* (2006.01)
- *B41M 7/00* (2006.01)
- *C09D 11/101* (2014.01)
- *C09D 11/322* (2014.01)
- *C08K 5/101* (2006.01)

(52) U.S. Cl.
CPC .......... *B41J 11/0015* (2013.01); *B41M 5/0023* (2013.01); *B41M 7/0081* (2013.01); *C09D 11/101* (2013.01); *C09D 11/322* (2013.01); *B41J 2202/20* (2013.01); *C08K 5/101* (2013.01)

(56) References Cited

U.S. PATENT DOCUMENTS

| | | | |
|---|---|---|---|
| 2007/0058020 A1 | 3/2007 | Wetjens | |
| 2010/0239777 A1* | 9/2010 | Nakajima | C09D 11/322 427/508 |
| 2011/0141187 A1* | 6/2011 | Takabayashi | B41M 5/0023 347/20 |
| 2013/0307913 A1* | 11/2013 | Kawashima | B41J 2/155 347/100 |

FOREIGN PATENT DOCUMENTS

| | | | | |
|---|---|---|---|---|
| JP | 2009-108172 A | 5/2009 | | |
| JP | 2009-132919 A | 6/2009 | | |
| JP | 2010-024268 A | 2/2010 | | |
| JP | 2010-241954 A | 10/2010 | | |
| JP | 2011-021118 A | 2/2011 | | |
| JP | 2011-025684 A | 2/2011 | | |
| JP | 2011-057900 A | 3/2011 | | |
| JP | 2011-116873 A | 6/2011 | | |
| JP | 2011-121297 A | 6/2011 | | |
| JP | 2011-208019 | 10/2011 | | |
| JP | 2011208019 A | * 10/2011 | ................ | B41J 2/01 |
| WO | WO2007/025893 A1 | 3/2007 | | |
| WO | 2010/058816 | 5/2010 | | |

OTHER PUBLICATIONS

Office Action dated Jun. 2, 2015 issued from the corresponding Japanese patent application No. 2012-102763.

English translation of Office Action dated Jun. 2, 2015 issued from the corresponding Japanese patent application No. 2012-102763.

* cited by examiner

PHOTOCURABLE INKJET AND IMAGE FORMING METHOD USING SAME

CROSS REFERENCE TO RELATED APPLICATION

This Application is a 371 of PCT/JP2012/007876 filed on Dec. 10, 2012 which, in turn, claimed the priority of Japanese Patent Application No. JP2011-269458 filed on Dec. 8, 2011 and Japanese Patent Application No. JP2012-015264 filed on Jan. 27, 2012, all applications are incorporated herein by reference.

TECHNICAL FIELD

The present invention relates to a photocurable inkjet ink and an image forming method using the same.

BACKGROUND ART

Recently, from the viewpoint of simple and inexpensive image production, inkjet recording has been used in a variety of printing fields including photographs, prints, marking, and special prints like color filters. Examples of inkjet inks used for inkjet recoding include aqueous inkjet ink containing water as a main solvent. Further, there are oil-based inkjet inks substantially free from water, which contain mainly a non-volatile solvent which does not volatilize at room temperature; non-aqueous inkjet inks substantially free from water, which contain mainly a solvent which volatilizes at room temperature; and hot-melt inks which are solid at room temperature and melt by heating for printing. Actinic radiation curable inkjet inks are also known that are cured by irradiation with actinic rays such as UV rays after printing and are put into practical use in applications including coating compositions for plastics, paper, wood and inorganic materials, adhesives, printing inks, printed circuit boards, electrical insulation, and other related applications As a method for increasing the pinning property of an UV curable inkjet ink, for example, addition of gelling agents for temperature-induced sol-gel phase transition has been studied. Specifically, studies have been made to prevent combining of dots by discharging liquid ink droplets at high temperature and cooling the ink droplets for gelation at the same time they are landed on a recording medium. As for the gelling agent to be added to an ink, stearone and the like are disclosed (see PTL 1 and PTL 2).

Examples of light sources for photocuring of the UV curable inkjet ink landed on a recording medium include a high pressure mercury lamp, an LED, and a low pressure mercury lamp. UV curable inks which can be cured using an LED or a low pressure mercury lamp, which features low power consumption, have been desired. However, when a light source with low illuminance such as LED is used for an UV curable inkjet ink, a cured ink film may easily have insufficient degree of curing. For such reasons, the cured film becomes sticky. Although the stickiness of the cured film of an UV curable inkjet ink can be lowered by adding a gelling agent, the strength of the cured film is insufficient.

Addition of an amine-modified oligomer or branched polymer to an inkjet ink for improved curability is described (refer to PTL 3 and PTL 4).

CITATION LIST

Patent Literature

PTL 1
US Patent Application Publication No. 2007/0058020
PTL 2
International Publication No. WO2007/025893
PTL 3
Japanese Patent Application Laid-Open No. 2011-21118
PTL 4
Japanese Patent Application Laid-Open No. 2009-108172

SUMMARY OF INVENTION

Technical Problem

However, there are cases where an image with a cured film having high scratch resistance (hardness) cannot be formed even when an amine-modified oligomer or a branched polymer is added to the inkjet ink containing a gelling agent. In particular, the scratch resistance of the cured film easily decreases when a light source with relatively low illuminance such as LED is used.

To overcome the foregoing drawback the inventors made studies to form, with an inkjet ink containing a gelling agent, an image with high curability and provides no sticky feeling on the image surface.

The present invention has been achieved in view of the circumstances described above, and an object thereof is to provide, regarding an inkjet ink containing a gelling agent, a photocurable inkjet ink capable of forming stably an image with high scratch resistance (hardness) even when a light source with relatively low illuminance is used, and an image forming method using the same.

Solution to Problem

According to the present invention, it was found that the aforementioned object can be achieved by using a polyfunctional curable oligomer which has a glass transition temperature (Tg) of predetermined value or higher. By adding a polyfunctional curable oligomer in an inkjet ink, photoreactivity can be enhanced and also a degree of crosslinking of a cured product can be increased. Furthermore, when the glass transition temperature (Tg) of the curable oligomer is set to 40° C. or higher, molecular motion of the oligomer in an actual environment is limited so that a decrease in hardness of the cured product can be prevented.

The present invention relates to a photocurable inkjet ink and an image forming method using the same as described below.

[1] A photocurable inkjet ink including a curable monomer, a photopolymerization initiator, a gelling agent, a colorant, and a curable oligomer, in which the number of a functional group of the curable oligomer is in a range of from 2 to 20, a glass transition temperature of the curable oligomer is 40° C. or higher, and a content of the curable oligomer is from 2 to 20 wt % relative to a total weight of the ink.

[2] The photocurable inkjet ink according to [1], in which the number of the functional group of the curable oligomer is from 6 to 20.

[3] The photocurable inkjet ink according to [1] or [2], in which a viscosity at 25° C. of the curable oligomer is from 100 to 10,000 mPa·s.

[4] The photocurable inkjet ink according to any one of [1] to [3], in which the curable oligomer is either a dendrimer or a hyperbranched oligomer.

[5] The photocurable inkjet ink according to any one of [1] to [4], in which the photocurable inkjet ink further contains a (meth)acrylate compound having a C log P value in a range of from 4.0 to 7.0.

[6] The photocurable inkjet ink according to [5], in which a content of the (meth)acrylate compound having a C log P value in a range of from 4.0 to 7.0 is from 10 to 40 wt % relative to the total weight of the ink.

[7] The photocurable inkjet ink according to [6], in which a molecular weight of the (meth)acrylate compound having a C log P value in a range of from 4.0 to 7.0 is in a range of from 280 to 1,500.

[8] The photocurable inkjet ink according to any one of [5] to [7], in which the (meth)acrylate compound having a C log P value in a range of from 4.0 to 7.0 is at least one (meth) acrylate compound of the following (1) and (2):

(1) a (meth)acrylate compound with a functionality of 3 or more, the (meth)acrylate compound having a structure represented by $(-C(CH_3)H-CH_2-O-)_m$ (where m is an integer of from 3 to 14) in a molecule, and (2) a (meth)acrylate compound with a functionality of 2 or more, the (meth)acrylate compound having a cyclic structure in a molecule.

[9] The photocurable inkjet ink according to any one of [1] to [8], in which the gelling agent is at least one compound of the compounds represented by the following Formulas (G1) and (G2):

$$R1-CO-R2, \quad \text{Formula (G1):}$$

$$R3-COO-R4 \quad \text{Formula (G2):}$$

where R1 to R4 each independently represent an alkyl chain which has a linear chain moiety with 12 or more carbon atoms and also may have a branch.

[10] The photocurable inkjet ink according to any one of [1] to [9], in which the colorant is a black pigment.

[11] An image forming method including: attaching ink droplets of the photocurable inkjet ink according to any one of [1] to [10] to a recording medium by discharging the ink droplets from an inkjet recording head; and curing the droplets landed on the recoding medium by irradiation with light having a wavelength of from 360 to 410 nm using an LED light source.

[12] The image forming method according to [11], in which a peak illuminance of the LED light source is 3 W/cm$^2$ or higher.

[13] The image forming method according to [11] or [12], in which a temperature of the recording medium when the photocurable inkjet ink is landed on the recording medium is from 10 to 20° C. lower than a sol-gel phase transition temperature of the ink.

Advantageous Effects of Invention

According to the present invention, an image with high scratch resistance can be stably formed even when a light source with relatively low illuminance is used for an inkjet ink containing a gelling agent.

DESCRIPTION OF EMBODIMENTS

Figure 1A:
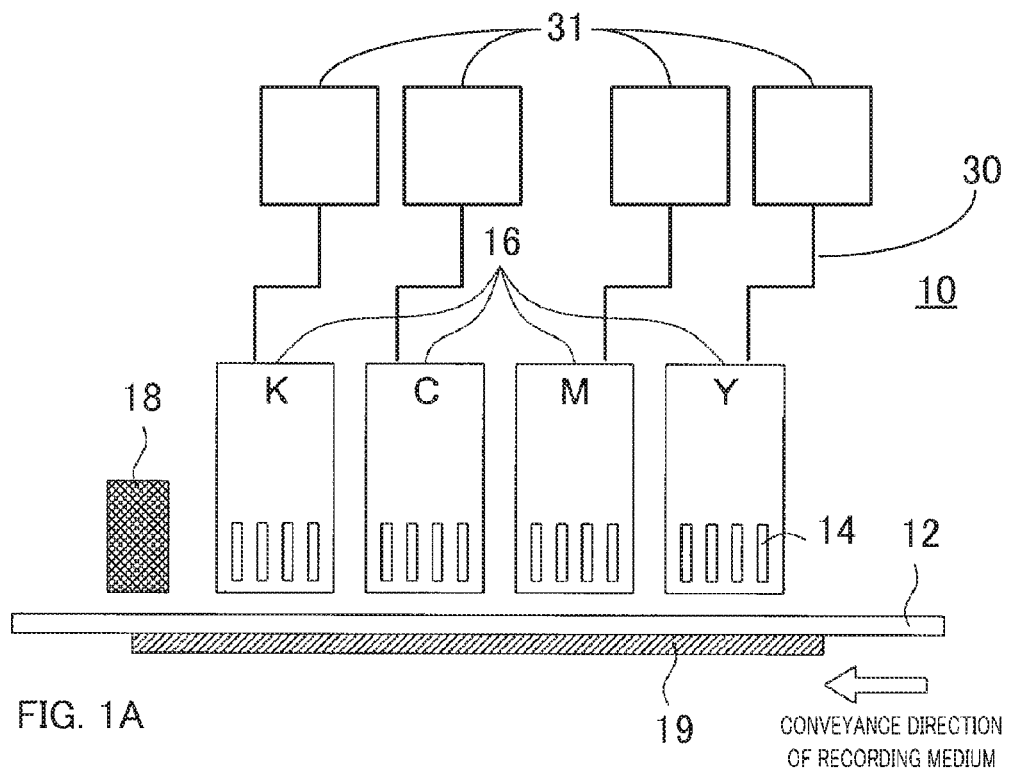
FIGS. 1A and 1B illustrate examples of the configuration of main parts of inkjet recording apparatus of a line recording type.

Hereinafter, the present invention is described with reference to embodiments, but the present invention is not limited to the following embodiments.

1. Photocurable Inkjet Ink

The inkjet ink according to an embodiment is characterized by including at least a curable monomer, a photopolymerization initiator, a gelling agent, a colorant, and a curable oligomer.

<Curable Oligomer>

The curable oligomer contained in the inkjet ink according to an embodiment is a compound which is crosslinked or polymerized by irradiation with light. The curable oligomer is also a compound having a polymer of a monomer as a main chain, but the number of the monomers constituting the main chain is not limited. The molecular weight of the oligomer is preferably in a range of from 500 to 20,000.

The number of the functional group of the curable oligomer is preferably from 2 to 20, more preferably from 4 to 20, and even more preferably from 6 to 20. The functional group contained in the curable oligomer refers to a photopolymerizable functional group. The photopolymerizable functional group includes a carbon-carbon double bond such as an acryloyl group. As the number of the functional group increases, curing sensitivity of the curable oligomer increases and also hardness of the cured film increases. When the number of the functional groups is excessively large, shrinkage of the cured film easily occurs so that a recording medium having an image formed thereon can be easily deformed.

The glass transition temperature (Tg) of the curable oligomer is preferably 40° C. or higher, more preferably 50° C. or higher, and even more preferably 70° C. or higher. Measurement of the glass transition temperature (Tg) can be performed by differential scanning calorimetry (DSC), thermomechanical analysis (TMA), or the like.

The viscosity of the curable oligomer is not particularly limited. However, in consideration of an influence on the ink handlability and ink viscosity, the viscosity at 25° C. is preferably from 100 to 10,000 mPa·s, more preferably 5,000 mPa·s or less, and even more preferably 1,000 mPa·s or less.

The main chain of the curable oligomer can be polyepoxy, aliphatic polyurethane, aromatic polyurethane, aliphatic polyester, aromatic polyester, polyamine, polyacrylate, or the like. It is preferable that the aforementioned photopolymerizable functional group is added to the main chain of the curable oligomer.

The functional group of the curable oligomer can be introduced by reacting the main chain of the curable oligomer with a compound containing the following (photopolymerizable) functional group. Examples of the compound containing the (photopolymerizable) functional group include unsaturated carboxylic acids, such as (meth)acrylic acid, itaconic acid, crotonic acid, isocrotonic acid and maleic acid, and salts or esters thereof, urethane, amide and an anhydride thereof, acrylonitrile, styrene, various unsaturated polyesters, unsaturated polyether, unsaturated polyamide, and unsaturated urethane. In addition to them, an N-vinyl compound may be contained. Examples of the N-vinyl compound include N-vinyl formamide, N-vinylcarbazole, N-vinylacetamide, N-vinylpyrrolidone, N-vinylcaprolactam, acryloylmorpholine, and derivatives thereof.

Preferred examples of the curable oligomer include epoxy (meth)acrylate, amine(meth)acrylate, aliphatic urethane (meth)acrylate, aromatic urethane(meth)acrylate, aliphatic polyester(meth)acrylate, and aromatic polyester(meth)acrylate.

In order to increase the glass transition temperature (Tg) of the curable oligomer, the main chain structure may be stiffened by introducing an aromatic ring, an amide structure, or the like to the main chain of the oligomer, or a bulky substituent group may be introduced to the side chain of the oligomer.

The curable oligomer may be a straight-chain oligomer, a branched-chain oligomer, or a branched oligomer, but there is a case in which a branched-chain oligomer or a branched oligomer is preferred. The branched-chain oligomer and branched oligomer have relatively low viscosity so that they can increase the hardness of a cured film in spite of a difficulty in raising the viscosity of an ink composition. The branched oligomer means an oligomer having a plurality of branched chains in one molecule.

Examples of the branched oligomer include dendrimers, hyperbranched oligomers, star oligomers, and graft oligomers. The dendrimers, hyperbranched oligomers, star oligomers and graft oligomers may be any of the compounds known in the art. Among them, dendrimers and hyperbranched oligomers are preferred, with hyperbranched oligomers being more preferred. Dendrimers and hyperbranched oligomers are less likely to increase the viscosity of the photocurable inkjet ink.

The hyperbranched oligomer refers to an oligomer having a plurality of photopolymerizable functional groups bound to an oligomer in which two or more monomers is bound as a repeat unit. In general, a plurality of photopolymerizable functional groups is contained in a hyperbranched oligomer. For such reasons, the hyperbranched oligomer can have even higher curing speed of a photocurable inkjet ink and even higher hardness of a cured film. The number of the photopolymerizable functional groups possessed by one molecule of the hyperbranched oligomer is preferably 6 or more.

Examples of the hyperbranched oligomer include polyester acrylate with a functionality of 6, polyester acrylate with a functionality of 9, and polyester acrylate with a functionality of 16.

Examples of the commercially available product of the curable oligomer include the followings.

CN292, CN2272, CN2303, CN2304, CN509, CN551, CN790, CN2400, CN2401, CN2402, CN9011 (all manufactured by Sartomer Company, Inc.), EBECRYL600, EBECRYL605, EBECRYL3700, ERECRYL3701, EBECRYL3702, EBECRYL3703, EBECRYL1830, EBECRYL80, EBECRYL8210, EBECRYL8301 (all manufactured by D a A. cel Cytec Ca., Ltd.), and Etercure6147, Etercure6172-1, Etercure6153-1, Etercure6175-3, Etercure6234, Etercure6237 (all manufactured by Eternal Chemical Ca., Ltd.)

Examples of the commercially available product of the hyperbranched oligomer include the followings.

CN2300, CN2301, CN2302 (all manufactured by Sartomer Company, Inc.), Etercure6361-100, Etercure6362-100 (all manufactured by Eternal Chemical Co., Ltd), and V#1000, V#1020 (all manufactured by, Osaka Organic Chemical, Ind., Ltd.)

The content of the curable oligomer relative to the total weight of the inkjet ink is preferably from 2 to 20 wt %, more preferably from 4 to 20 wt %, and even more preferably from 4 to 15 wt %. When the content of the oligomer is less than 2 wt %, there is a case in which hardness of an image, which is a cured ink product, is not sufficiently high. On the other hand, when the content is more than 20 wt %, clogging of a nozzle of an inkjet recording head may occur due to increase in ink viscosity or satellites (small liquid droplets that are landed as separated from main liquid droplets) may be increased, or crosslinking density of the cured ink product is excessively high so that the recording medium is shrunken by curing.

By adding the curable oligomer to the inkjet ink according to an embodiment, an image with high curability can be formed even if the ink contains a gelling agent. The reason for this is that by blending a polyfunctional curable oligomer with a glass transition temperature (Tg) of 40° C. or higher, the molecular motion of the oligomer can be limited in an actual environment.

The inkjet ink according to an embodiment may contain an oligomer other than the aforementioned curable oligomer. For example, by blending an oligomer with a monofunctional group and a low glass transition temperature (e.g., lower than 40° C.) as other oligomer, flexibility of the cured ink film can be enhanced or shrinkage caused by curing can be prevented. Examples of commercially available products of other oligomer include CN371, CN2285, CN2273, and CN2304 (manufactured by Sartomer Company, Inc.).

<Curable Monomer>

The curable monomer is a compound which is crosslinked or polymerized by irradiation with light. The curable monomer is a radical polymerizable monomer or a cation polymerizable monomer, and it is preferably a radical polymerizable monomer.

The radical polymerizable monomer can be any of the radical polymerizable monomers known in the art. For example, known examples include photocurable materials containing photopolymerizable compositions and cationic polymerization-based photocurable resins disclosed in Japanese Patent Application Laid-Open No. 07-159983, Japanese Examined Patent Application Publication No. 07-31399, and Japanese Patent Application Laid-Open Nos. 08-224982 and 10-863. Recently, photo cationic polymerization-based photocurable resins sensitized to longer wavelengths than visible light are also known (e.g., Japanese Patent Application Laid-Open Nos. 06-43633 and 08-324137).

The radical polymerizable monomer is a compound which has a radical polymerizable ethylenically unsaturated bond, and it is a compound which has at least one radical polymerizable ethylenically unsaturated bond in a molecule. The radical polymerizable monomer may be used either singly or in combination at any ratio in order to improve target characteristics.

Examples of the monomer having a radical polymerizable ethylenically unsaturated bond include unsaturated carboxylic acids, such as acrylic acid, methacrylic acid, itaconic acid, crotonic acid, isocrotonic acid and maleic acid, and salts or esters thereof, and a radical polymerizable compound such as urethane, amide or anhydride, acrylonitrile, styrene, further various unsaturated polyester, unsaturated polyether, unsaturated polyamide, and unsaturated urethane.

The radical polymerizable monomer according to an embodiment can be any kind of known (meth)acrylate monomers. The monomer having a (meth)acrylate group can be a monofunctional monomer, a bifunctional monomer, or a polyfunctional monomer with a functionality of 3 or more.

Examples of the monofunctional monomer include isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyl hexahydrophthalic acid, butoxyethyl acrylate, ethoxydiethylene glycol acrylate, methoxy diethylene glycol acrylate, methoxy polyethylene glycol acrylate, methoxy propylene glycol acrylate, phenoxyethyl acrylate, tetrahydrofurfuryl acrylate, isobornyl acrylate, 2-hydroxyethyl acrylate, 2-hydroxypropyl acrylate, 2-hydroxyl-3-phenoxypropyl acrylate, 2-acryloyloxyethyl succinic acid, 2-acryloyloxyethyl phthalic acid, 2-acryloyloxyethyl-2-hydroxyethyl-phthalic acid, lactone modified flexible acrylate, and t-butylcyclohexyl acrylate.

Examples of the bifunctional monomer include triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, diacrylate of PO adduct with bisphenol-A, hydroxyl pivalic acid neopentyl glycol diacrylate, and polytetramethylene glycol diacrylate.

Examples of the polyfunctional monomer with a functionality of 3 or more include trimethylolpropane triacrylate, pentaerythritol triacrylate, EO modified trimethylolpropane triacrylate, pentaerythritol tetraacrylate, EO modified pentaerythritol tetraacrylate, dipentaerythritol hexaacrylate, ditrimethylol propane tetraacrylate, glycerin propoxy triacrylate, caprolactone modified trimethylolpropane triacrylate, pentaerythritol ethoxy tetraacrylate, and caprolactam modified dipentaerythritol hexaacrylate.

Among them, polyethylene glycol diacrylate, dipentaerythritol hexaacrylate, EO modified trimethylolpropane triacrylate, EO modified pentaerythritol tetraacrylate, and the like are preferred.

As a polymerizable monomer, a vinyl ether monomer and a (meth)acrylate monomer can be used in combination. Examples of the vinyl ether monomer include a di- or trivinyl ether compound such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, or trimethylol propane trivinyl ether, and a monovinyl ether compound such as ethylvinyl ether, n-butyl vinyl ether, isobutyl vinyl ether, octadecyl vinyl ether, cyclohexylvinyl ether, hydroxybutyl vinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, or octadecylvinyl ether.

As a polymerizable monomer, various vinyl ether compounds and maleimide compounds can be used in combination. Examples of the maleimide compounds include N-methyl maleimide, N-propyl maleimide, N-hexyl maleimide, N-lauryl maleimide, N-cyclohexyl maleimide, N-phenyl maleimide, N,N'-methylene bis maleimide, polypropylene glycol-bis(3-maleimide propyl)ether, tetraethylene glycol-bis(3-maleimide propyl)ether, bis(2-maleimide ethyl)carbonate, N,N'-(4,4'-diphenylmethane)bis maleimide, N,N'-2,4-trilene bis maleimide, or a polyfunctional maleimide compound which is an ester compound of maleimide carboxylic acid and various polyols disclosed in Japanese Patent Application Laid-Open No. HEI 11-124403, but it is not limited thereto.

Examples of a commercially available product of the radical polymerizable monomer include NKester A-400 (manufactured by Shin-Nakamura Chemical Co., Ltd.), SR499 (manufactured by Sartomer Company, Inc.), SR494 (manufactured by Sartomer Company, Inc.), and Miramer M600 (manufactured by Miwon).

The addition amount of the radical polymerizable monomer as a photocurable monomer is preferably from 60 to 96 wt %, and more preferably from 70 to 90 wt % relative to the total weight of the ink composition.

The inkjet ink according to an embodiment more preferably contains, among the monofunctional monomer, the bifunctional monomer, and the polyfunctional monomer with a functionality of 3 or more, a (meth)acrylate compound having a C log P value in a range of from 4.0 to 7.0 (hereinafter, referred to as a "polymerizable compound A").

<Polymerizable Compound A>

The polymerizable compound A is a compound having a (meth)acrylate group and it more preferably has two or more (meth)acrylate groups.

The molecular weight of the polymerizable compound A is preferably in a range of from 280 to 1,500, and more preferably in a range of from 300 to 800. For stable discharge of ink droplets from the inkjet recording head, the ink viscosity is preferably between 7 and 14 mPa·s at a discharge temperature.

The ink composition containing a polymerizable compound with a molecular weight of less than 280 and a gelling agent has an excessively large change in ink viscosity near the discharge temperature. As such, it is difficult to maintain the temperature of the ink composition that is required for stable discharge from the inkjet recording head. However, by selecting a polymerizable compound with a molecular weight of 280 or more, odor of the ink itself or of printed matter, which has been the problem pertinent in the inks containing the conventional radical polymerizable compound, can be also avoided. In view of the above, the molecular weight of the polymerizable compound A is preferably in the aforementioned range.

Furthermore, an ink composition containing a polymerizable compound with a molecular weight of more than 1,500 and a gelling agent is not suitable as a composition of an inkjet ink since it has excessively high sol viscosity.

The C log P value of the polymerizable compound A is preferably in a range of from 4.0 to 7.0, and more preferably in a range of from 4.5 to 6.0.

When the C log P value of the polymerizable compound A is lower than 4.0, the inkjet ink becomes hydrophilic, and thus it is difficult for the gelling agent to be dissolved, and also there is a case in which the gelling agent is not fully dissolved even by heating, and thus the gelling agent is not stabilized. Further, when the C log P value of the polymerizable compound A is more than 7.0, the solubility of the photopolymerization initiator and initiation promoter in the ink is lowered so that the curability and/or ability of ink discharge from the inkjet recording head are lowered. In view of the above, the C log P value of the polymerizable compound A is preferably in the aforementioned range.

As used herein, the term "Log P value" is a coefficient indicating the affinity of an organic compound to water and 1-octanol. Regarding the 1-octanol/water partition coefficient P, a partition equilibrium achieved when a trace amount of a compound is dissolved as a solute in a two-liquid phase solvent of 1-octanol and water, the partition coefficient P is the ratio of equilibrium concentrations of the compound in the respective solvents, and is expressed as Log P, the logarithm to the base 10 of the partition coefficient. That is, the "log value" is a logarithmic value of the partition coefficient of 1-octanol/water, and is known as an important parameter indicating the hydrophilicity and hydrophobicity of a molecule.

"C log P" is a Log P value found by calculation. The C log P value can be calculated by the fragment method, atomic approach method or the like. More specifically, in order to calculate the C log P value, the fragment method described in literatures (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA)

The numerical value of the C log P value as used herein is a "C log P value" calculated using software package 2.

The content of the polymerizable compound A in an inkjet ink is preferably in a range of from 10 to 40 wt %. When the content is less than 10 wt %, the ink becomes hydrophilic and the solubility of the gelling agent is lowered, and thus the gelation stability is impaired. Further, when the content is more than 40 wt %, high shrinkage is yielded when the ink droplets are cured, and the printed matter is curled. Accordingly, there may be a case in which the image film is torn when the image is bent.

More preferred examples of the polymerizable compound A include (1) a methacrylate or acrylate compound with a functionality of 3 or more, which has a structure represented by $(-C(CH_3)H-CH_2-O-)_m$ (where m is an integer of from 3 to 14) in the molecule, and (2) a methacrylate or acrylate compound with a functionality of 2 or more, which has a cyclic structure in the molecule. Those polymerizable compounds have high photocurability, prevented shrinkage at curing, and further improved reproducibility of sol-gel phase transition.

Examples of (1) the methacrylate or acrylate compound with a functionality of 3 or more, which has a structure represented by $(-C(CH_3)H-CH_2-O-)_m$ (m is an integer of from 3 to 14) in the molecule include a compound obtained by modifying a hydroxyl group of a compound having three or more hydroxyl groups with propylene oxide and esterifying the obtained modified product with (meth)acrylic acid. Specific examples of the compound include 3PO modified trimethylolpropane triacrylate Photomer 4072 (molecular weight 471, C log P 4.90, manufactured by Cognis) and 3PO modified trimethylolpropane triacrylate Miramer M360 (molecular weight 471, C log P 4.90, manufactured by Miwon).

Examples of (2) the methacrylate or acrylate compound with a functionality of 2 or more, which has a cyclic structure in the molecule include a compound obtained by esterifying a hydroxyl group of a compound having two or more hydroxyl groups and tricycloalkane with (meth)acrylic acid. Specific examples of the compound include tricyclodecane dimethanol diacrylate NKester A-DCP (molecular weight 304, C log P 4.69) and tricyclodecane dimethanol dimethacrylate NKester DCP (molecular weight 332, C log P 5.12).

Another specific examples of the polymerizable compound A include 1,10-decanediol dimethacrylate NKester DOD-N (molecular weight 310, C log P 5.75, manufactured by Shin-Nakamura Chemical Co., Ltd.).

The working mechanism between the curable oligomer and the polymerizable compound A can be considered as follows, although it is not clearly defined. The curable oligomer with a repeating unit has a hydrophilic moiety with weak polarity such as an ester group or an ether group. For such reasons, it can be assumed that by mixing of the curable oligomer with the polymerizable compound A having relatively high hydrophobicity, (1) the gelling agent having a hydrophobic moiety and a hydrophilic moiety (polar group) can be stably present (=compatible) at solation (at a high temperature) while it maintains high homogeneity, and also (2) the gelation (=crystallization) occurs rapidly at cooling, and therefore combining of ink droplets can be effectively prevented.

Such effect can be exhibited more by adding the polymerizable compound A in a range of from 10 to 40 wt % relative to the total weight of the ink when the curable oligomer is contained at from 2 to 20 wt % relative to the total weight of the ink.

Further, a urethane acrylate oligomer is also well known as the curable oligomer which is used as printing ink, ink, or coating compositions. Because the polarity of the urethane group is relatively strong, there is a case in which the compatibility at solation (at a high temperature) is impaired or the gelation (=crystallization) at cooling is inhibited. For such reasons, the curable oligomer is preferably a polyester oligomer and more preferably a dendrimer, or the hyperbranched oligomer is a polyester oligomer. Further, for the inkjet ink according to an embodiment, the polyester oligomer described below may be also preferably used.

Polyester Oligomer

The polyester acrylate oligomer preferably has an average functional group number of 2 or more (that is, two or more (meth)acrylic groups are contained on average in one molecule) from the viewpoint of enhancing the photocurability. The polyester acrylate oligomer indicates a compound of polyester oligomer having a hydroxyl group esterified with (meth)acrylic acid.

The viscosity of the polyester acrylate oligomer at 25° C. according to an embodiment is preferably from 40 to 1,000 mPa·s, and more preferably from 50 to 700 mPa·s from the viewpoint of discharge stability.

The content of the polyester acrylate oligomer in the inkjet ink according to an embodiment is preferably in a range of from 5.0 to 20.0 wt %, and more preferably from 7.0 to 15.0 wt %. By adding the polyester oligomer in the aforementioned range, an inkjet ink in which a balance between gelation performance and ink ejection performance is struck can be produced.

Specific examples of the polyester acrylate oligomer include the followings, but not limited thereto.

Laromer PE9074 manufactured by BASF: average functional group number of 2, viscosity at 25° C. of from 7,000 to 13,000 mPa·s.

CN2270: average functional group number of 2, viscosity at 25° C. of 55 mPa·s, CN2273: average functional group number of 2, viscosity at 25° C. of 100 mPa·s, and CN2303: average functional group number of 6, viscosity at 25° C. of 350 mPa·s, manufactured by Sartomer Company, Inc.

ETERCURE6361-100: average functional group number of 8, viscosity at 25° C. of 200 mPa·s, and ETERCURE6362-100: average functional group number of from 12 to 15, viscosity at 25° C. of 600 mPa·s, manufactured by ETERNAL CHEMICAL COMPANY M-6200: average functional group number of 2, viscosity at 25° C. of from 700 to 3700 mPa·s, and M-6250: average functional group number of 2, viscosity at 25° C. of from 300 to 700 mPa·s, manufactured by Toa Synthetic Chemical Co., Ltd.

<Gelling Agent>

The gelling agent contained in the photocurable inkjet ink has a function of causing the ink to undergo temperature-induced reversible sol-gel phase transition. Such a gelling agent is required to satisfy at least the followings requirements: 1) the gelling agent is dissolved in a photopolymerizable compound (curable monomer, curable oligomer) at a temperature higher than the gelation temperature and 2) the gelling agent is crystallized in the ink at a temperature lower than the gelation temperature.

Regarding the above requirement 1), "sol-gel phase transition temperature" means a temperature of change (transition) point at which a change (transition) from sol state to gel state occurs, and it has the same meaning as the terms like gel transition temperature, gel dissolution temperature, gel softening temperature, sol-gel transition point, and gelling point.

Regarding the above requirement 2), when the gelling agent is crystallized in an ink, it is preferable that a space three-dimensionally surrounded by plate-like crystals, a crystallization product of the gelling agent, is formed so that the photopolymerizable compound is included in that space. A structure in which a photopolymerizable compound is included in a space three-dimensionally surrounded by plate-like crystals can be referred to as a "card house structure." Once a card house structure is formed, the liquid photopolymerizable compound can be maintained and ink droplets can be pinned. Accordingly, combining of liquid droplets can be prevented. The card house structure indicates a state having a liquid photopolymerizable compound maintained in its space.

The sol-gel transition temperature of the inkjet ink is arbitrarily set, but from the viewpoint of stabilized discharge properties of the ink droplets, adverse effects that accompany heating at a high temperature and the like, it is preferably in a range of from 30 to 100° C. Further, the sol-gel transition temperature is preferably between the ink temperature inside the inkjet recording head and the temperature of the recording medium.

Regarding the method for measuring the sol-gel transition temperature, for example, a gel-like specimen is placed on a heating plate, the heating plate is heated, and the temperature at which the shape of the specimen is destroyed is measured. This temperature can be determined as the sol-gel phase transition temperature. Furthermore, it can be also measured using a commercially available viscoelasticity meter (e.g., viscoelasticity meter MCR300 manufactured by Physica Messtechnik GmbH).

The sol-gel transition temperature can be adjusted according to the type, amount of addition and the like of the gelling agent, photopolymerizable compound, and the like that will be described below.

The "gel" state as used herein means solidified or semi-solidified state of material accompanied by a rapid viscosity increase or remarkable elasticity increase, wherein the material has structure in which solutes gathered as a result of losing their independent mobility due to lamella structure, a polymer network with covalent bonds and/or hydrogen bonds, and a polymer network formed by physical coagulation.

The requirement generally needed for gelation, that is, the structure required for a gelling agent, is to have a hydrophobic part (e.g., an alkyl chain having 12 or more carbon atoms) and a hydrophilic part (e.g., a polar group) together. Accordingly, when the temperature of the ink is lowered, and the molecular motion of the photopolymerizable compounds that serve as solvents is decreased, the hydrophobic parts gather together surrounding the solvent under the action of intermolecular force, and the hydrophilic parts gather under the action of hydrogen bonding. Thereby, a gel is formed.

Examples of the gelling agent include dialkyl ketones, fatty acid esters, fatty acid alcohols, and oil gelling agents.

Specific examples of the gelling agent include low molecular weight compounds having molecular weights of less than 1,000, such as fatty acid alcohols such as stearone (18-pentatriacontanone), 16-hentriacontanone, 12-tricosanone, and UNILIN425; fatty acid esters; inulin stearate-fatty acid dextrin (available from Chiba Flour Milling Co., Ltd. as RHEO-PEARL series); L-glutamic acid derivatives (available from Ajinomoto Fine-Techno Co., Inc.); fatty acid amides (FATTY AMID series, available from Kao Corp.); glyceryl behenate/eicosanedioate (NOMCORT HK-G, Nisshin Oillio Group, Ltd.); jojoba ester (FLORAESTER 70, available from Ikeda Corp.); and the oil gelling agents described in Japanese Patent Application Laid-Open No. 2005-126507 or 2005-255821. However, it is not intended to be limited to these.

Furthermore, specific examples of the gelling agent that is the fatty acid amide, include FATTY AMID E: erucic acid amide, FATTY AMID T: oleic acid amide, FATTY AMID O-N: hardened beef tallow acid amide (all available from Kao Corporation), NIKKA AMIDE API: stearic acid amide (available from Nippon Kasei Chemical Co., Ltd.), and GP-1: N-lauroyl-L-glutamic acid dibutylamide (available from Ajinomoto Fine-Techno Co., Inc.).

In the present invention, from the viewpoint of the gelling ability, examples of the gelling agents that are particularly preferably used include compounds represented by the following Formula (G1) and (G2):

R1-CO—R2     Formula (G1):

R3-COO—R4     Formula (G2):

where R1 to R4 each independently represent an alkyl chain having a straight chain moiety having 12 or more carbon atoms, which may also have a branch.

These gelling agents can prevent combining of dots more stably (with satisfactory reproducibility).

Specific examples of more preferred gelling agent include those described in the following Table 1, but it is not limited thereto.

TABLE 1

| Classification | Structure | Name | Manufacturer |
|---|---|---|---|
| Ketone wax | Distearyl ketone | Kao wax T1 | Kao Corporation |
| | | 18-Pentatriacontanone | Reagent (Arfa Aeser) |
| | Dipalmityl ketone | Hentriacontan-16-on | Reagent (Arfa Aeser) |
| | Dilauryl ketone | 12-tricosanone | Reagent (Aria Aeser) |
| Fatty acid ester | Stearyl stearate | EXCEPARL SS | Kao Corporation |
| | | UNISTAR M-9676 | NOF Corporation |
| | | EMALEX CC-18 | NIHON EMULSION Co., Ltd. |
| | | AMREPS SS | KOKYU ALCOHOL KOGYO CO., LTD. |
| | Cetyl palmitate | AMREPS PC | KOKYU ALCOHOL KOGYO CO., LTD. |
| | Behenyl behenate | UNISTAR M-2222SL | NOF Corporation |

Because the inkjet ink according to an embodiment contains a predetermined amount of a gelling agent, when it is discharged from an inkjet recording head, landed as ink droplets on a recording medium, and cooled to a temperature lower than the sol-gel phase transition temperature, the ink quickly turns into a gel state. Accordingly, mixing or combining of dots is prevented, and a high quality image can be formed in high-speed printing. Thereafter, the inkjet ink is fixed onto the recording medium as the gelled ink droplets are cured by irradiation with light, and a firm image film is formed.

Because the inkjet ink according to an embodiment does not allow spread of ink droplets on a recording medium as the ink droplets landed on a recording medium quickly undergo gelation, it is less likely that oxygen in the environment enters the ink droplets. Thus, curing is less likely to be influenced by oxygen inhibition.

The content of the gelling agent is preferably from 2 to 10 wt %, and more preferably from 3 to 7 wt % of the total ink composition. If the content is less than 2 wt %, gel formation occurs insufficiently, and thus the combining of dots cannot be completely prevented. Furthermore, if the content is more than 10 wt %, curability after irradiation with actinic radiation decreases, which is problematic.

<Photopolymerization Initiator>

The inkjet ink according to an embodiment preferably contains a photopolymerization initiator from the viewpoint of obtaining high sensitivity. If necessary, it may further contain a sensitizing agent.

The photopolymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy)phenyl-(2-hydroxy-2-propyl)ketone, 1-hydroxy cyclohexyl phenyl ketone, 2-methyl-2-morpholino-(4-thio methylphenyl)propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photopolymerization include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanethon, and 2,4-dichloro thioxanethon; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

Among them, acylphosphine oxide or acyl phosphonate can be preferably used from the viewpoint of sensitivity. Specific examples of the preferred include bis(2,4,6-trimethylbenzoyl)-phenylphosphine oxide and bis(2,6-dimethoxybenzoyl)-2,4,4-trimethyl-pentylphosphine oxide.

Preferred addition amount of the photopolymerization initiator is from 0.1 to 10 wt %, and particularly preferably from 2 to 8 wt % of the total ink composition.

As a photopolymerization initiator, the photocurable inkjet ink may further contain a photoacid generating agent. As such photoacid generating agent, a compound used for chemical amplification type photoresists or photo-cationic polymerization is used (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

As an example of the sensitizing agent or sensitization promoter for the aforementioned photopolymerization initiator, amines not causing an addition reaction with the radical polymerizable monomer such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, 4,4'-bis(diethylamino)benzophenone, Michler's ketone, or ethyl 4-(N,N-dimethylamino)benzoate can be used in combination. Obviously, it is preferable to select and use a sensitizing agent or a sensitization sensitization promoter having excellent solubility for the radical polymerizable monomer.

The sensitizing agent and sensitization sensitization promoter are from 0.1 to 20 wt %, and preferably from 1 to 12 wt % of the total ink composition.

In addition to them, a type formed by bonding an amine-based initiation promoter as an initiator structure to a dendrimer core described in the specification of European Patent No. 1,674,499A, initiators having polymerizable groups described in the specifications of European Patent Nos. 2,161, 264A and 2,189,477A, or amine-based initiating agents, a type having a plurality of amine-based initiation promoters in one molecule described in European Patent No. 1,927,632B1, a type containing a plurality of thioxanthones in the molecule described in WO2009/060235, ESACURE ONE commercially available from Lamberti, and an oligomer type photopolymerization initiator having α-hydroxypropiophenone bonded in the side chain, typified by ESACURE KIP150 can be also used.

The photocurable inkjet ink may further contain a polymerization inhibitor, if necessary. Examples of the polymerization inhibitor include (alkyl)phenol, hydroquinone, catechol, resorcin, p-methoxyphenol, t-butyl catechol, t-butyl hydroquinone, pyrogallol, 1,1-picrylhydrazine, phenothiazine, p-benzoquinone, nitrosobenzene, 2,5-di-tert-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

<Colorant>

The inkjet ink according to an embodiment preferably contains at least one of various dyes and pigments known in the art, and particularly preferably contains a pigment.

Examples of the pigment which may be contained in the inkjet ink according to an embodiment are listed below.

C. I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213

C. I. Pigment Red 5, 7, 12, 22, 38, 48:1, 48:2, 48:4, 49:1, 53:1, 57:1, 63:1, 101, 112, 122, 123, 144, 146, 168, 184, 185, 202

C. I. Pigment Violet 19, 23

C. I. Pigment Blue 1, 2, 3, 15:1, 15:2, 15:3, 15:4, 18, 22, 27, 29, 60

C. I. Pigment Green 7, 36

C. I. Pigment White 6, 18, 21

C. I. Pigment Black 7

The average particle size of the pigment is preferably from 0.08 to 0.5 µm. The maximum particle size of the pigment is from 0.3 to 10 µm, and preferably from 0.3 to 3 µm. By controlling the particle size of the pigment, clogging in the nozzles of the inkjet recording head can be avoided, and ink storage stability, ink transparency, curing sensitivity can be maintained.

The dye which may be contained in the inkjet ink can be an oil soluble dye or the like. Examples of the oil soluble dye include the following various dyes.

Examples of magenta dye include MS Magenta VP, MS magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROTSB (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ, Blue Z-BGL, SIRIUS SUPRA TURQ, Blue FB-LL 330% (all manufactured by Bayer Japan), KAYASET Blue FR, KAYASET Blue N, KAYASET Blue 814, Turq Blue GL-5 200, Light Blue BGL-5 200 (all manufactured by Nippon Kayaku), DAIWA Blue 7000, Olosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSM-41, Yellow KX-7, Yellow EX-27 (Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR, Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of Black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESORIN Black BS (all manufactured by Bayer Japan), KAYASET Black SF-G, KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The content of the pigment or dye is preferably in a range of from 0.1 to 20 wt %, and more preferably from 0.4 to 10 wt % relative to the total ink composition. When the content of the pigment or dye is excessively low, color exhibition of an image to be obtained is insufficient. On the other hand, when it is excessively high, the ink viscosity is increased and ink ejection property decreases.

The inkjet ink according to an embodiment may contain, as a dispersion promoter, a synergist according to various pigments. The total amount of a dispersant and a dispersion promoter is preferably from 1 to 50 wt % relative to the weight of pigment.

The pigment needs to be dispersed in the inkjet ink. Thus, the inkjet ink according to an embodiment is preferably obtained by preparing a pigment dispersion followed by mixing again the pigment dispersion with other ink components.

Preparation of the pigment dispersion is obtained by dispersing a pigment in a dispersion medium. The dispersion of the pigment can be performed by using ball mill, sand mill, Attritor, roll mill, agitator, HENSCEL MIXER, colloid mill, ultrasound homogenizer, pearl mill, wet jet mill, or paint shaker, for example. Furthermore, when dispersing pigment, a dispersant may be added to the system. It is preferable to use a polymeric dispersant, and examples of the polymeric dispersant include SOLSPERSE series of Avecia Biotechnology, Inc., and PB series of Ajinomoto Fine-Techno Co., Inc.

The dispersion medium for the pigment dispersion can be also either a solvent or a polymerizable compound. However, since the inkjet ink according to an embodiment preferably undergoes gelation immediately after landing on a recording medium, the dispersion medium is preferably solvent-free. Further, if the solvent remains on a cured image, problems of reduced solvent resistance and the presence VOC in the remaining solvent occur, and thus a solvent-free ink is preferable. Therefore, for the dispersion medium for the pigment dispersion, it is preferable to select a polymerizable compound rather than a solvent, and it is most preferable to select a monomer having the lowest viscosity, in view of adaptability to dispersion.

It is required for the inkjet ink according to an embodiment that the ink droplets landed on a recording medium be not separated from the recoding medium even when a light source with low illuminance like an LED is used. However, when a black pigment is used, light directed on the ink droplets is absorbed by the black pigment on the surface of the cured film so that the interior of the cured film may be not sufficiently cured. Accordingly, ink droplets containing a black pigment fail to be fixed on the recording medium and are easily separated from the recording medium. By contrast, since the inkjet ink according to an embodiment contains a polyfunctional curable oligomer having a glass transition temperature, the ink can be easily cured and the formed image is not easily peeled off even when a black pigment is used.

<Other Components>

The photocurable inkjet ink may further contain other components if necessary. Other components can be various additives and other resins. Examples of the additives include surfactants, leveling agents, matting agents, UV absorbers, IR absorbers, antibacterial agents, and basic compounds that serve to increase the storage stability of ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, rubber resins, and waxes.

<Sol-Gel Transition Type Inkjet Ink>

Because the photocurable inkjet ink contains a gelling agent as described above, it undergoes a temperature-induced reversible sol-gel phase transition. Since a photocurable ink which undergoes sol-gel phase transition is a liquid (sol) at high temperatures (e.g., about 80° C.), the ink can be discharged in a sol state from the inkjet recording head. Once the photocurable inkjet ink is discharged at a high temperature, ink droplets (dots) are landed on a recording medium and undergo gelation by natural cooling. Accordingly, combining of adjacent dots is prevented and thus mage quality improves.

In order to enhance the ink ejection property, the viscosity of the ink at a high temperature is preferably the same or lower than a predetermined value. Specifically, the viscosity at 80° C. of the photocurable inkjet ink is preferably from 3 to 20 mPa·s. In order to prevent combining of adjacent dots, the ink viscosity at room temperature after landing preferably has a certain value or more. Specifically, the viscosity at 25° C. of the photocurable inkjet ink is preferably 1,000 mPa·s or more.

The gelation temperature of the ink is the same as described in the section for gelling agent.

The viscosity at 80° C. and viscosity and gelation temperature at 25° C. of the ink can be found by measuring a temperature change in dynamic viscoelasticity of the ink using a rheometer. Specifically, when the ink is heated to 100° C. and cooled to 20° C. with conditions including shear rate of 11.7 (/s) and temperature decrease rate of 0.1° C./s, a temperature change curve of the viscosity is obtained. Further, the viscosity at 80° C. and the viscosity at 25° C. can be obtained by reading each of the viscosities at 80° C. and 25° C. in a temperature change curve of the viscosity. The gelation temperature can be obtained as a temperature at which the viscosity is 200 mPa·s in a temperature change curve of the viscosity.

As for the rheometer, stress control type rheometer Physica MCR300 manufactured by Anton Paar can be used. The size of the corn plate can be 75 mm and the corn angle can be 1.0°.

<Method for Inkjet Ink Production>

The photocurable inkjet ink can be obtained by mixing the aforementioned photopolymerizable compound and components, including, a gelling agent, under heating. Preferably, the inkjet ink is obtained by preparing a pigment dispersion containing a colorant (in particular, pigment) dispersed in part of the polymerizable compound and mixing the pigment dispersion with other ink components including other polymerizable compound.

2. Inkjet Recording Apparatus and Image Forming Method Using the Same

The image forming method according to an embodiment includes at least two steps described below.

(1) A step of attaching a photocurable inkjet ink to a recording medium by discharging the photocurable inkjet ink from an inkjet recording head and (2) a step of curing the ink droplets by irradiating the droplets landed on the recoding medium with light from an LED light source.

Step (1)

It suffices that the photocurable inkjet ink is the inkjet ink described above.

Ink droplets are ejected from an inkjet recording head. To enhance the ink ejection property, the temperature of the inkjet ink inside the inkjet recording head is preferably set such that it is from 10 to 30° C. higher than the gelation temperature. When the ink temperature inside the inkjet recording head is lower than (gelation temperature+10)° C., the ink undergoes gelation inside the inkjet recording head or at the surface of the nozzle, and thus ink ejection property can be easily lowered. On the other hand, when the ink temperature inside the inkjet recording head is higher than (gelation temperature+30)° C., the ink is at excessively high temperature, and thus the ink components may be deteriorated.

Thus, the inkjet ink droplets having the above-described temperature may be discharged after heating the inkjet ink in the inkjet recording head, the inkjet ink in the ink channel connected to the inkjet recording head, or the inkjet ink inside the ink tank connected to the ink channel.

The amount of liquid per droplet discharged from each nozzle of the inkjet recording head may vary depending on the resolution of an image. However, it is preferably from 0.5 to 10 pl, and more preferably from 0.5 to 2.5 pl for forming an image with high definition.

The ink droplets landed on a recording medium is cooled and quickly undergoes gelation by sol-gel phase transition. As a result, the ink droplets can be pinned without being scattered. Furthermore, the oxygen inhibition of the photopolymerizable compound can be reduced as described above.

The recording medium can be either a paper sheet or a resin film. Examples of paper include coated paper coated paper B for printing. Further, examples of the resin film include a polyethylene terephthalate film and a vinyl chloride film.

By allowing ink droplets to be discharged from the inkjet recording head, the ink droplets are attached to a recording medium. The temperature of the recording medium at the time when the ink droplets land thereon is preferably set such that it is from 10 to 20° C. lower than the gelation temperature of the ink. When the temperature of the recording medium is excessively low, the ink droplets undergo gelation and pinned too fast so that leveling of the ink droplets does not occur sufficiently, and as a result, the glossiness of an image may be lowered. On the other hand, when the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling that does not allow for mixing among neighboring dots of the ink droplets and appropriate pinning The conveyance speed of the recording medium is preferably from 30 to 120 m/s. As the conveyance speed increases, the image forming speed also increases, and thus desirable. However, when the conveyance speed is excessively high, it results in reduced image quality, insufficient photocuring of the ink (which is described below), and the like.

Step (2)

By irradiating the ink droplets landed on a recording medium with light, the photopolymerizable compound contained in the ink droplets is crosslinked or polymerized to cure the ink droplets to form an image.

The light to be directed on the ink droplets attached to a recording medium is preferably UV light from an LED light source. Specifically, a water-cooled LED with 395 nm produced by Phoseon Technology can be used. As for the light source of UV light, there can be also a metal halide lamp. However, by employing an LED as a light source, the effect of preventing curing defects on a surface of the curing film of the ink droplets, which are caused by dissolution of the ink droplets by radiation heat from the light source, is obtained.

For curing of the ink droplets, an LED as a light source is installed such that it provides UV ray of from 360 to 410 nm wavelength with peak illuminance of 3 W/cm$^2$ or higher, and more preferably from 5 to 15 W/cm$^2$ on a surface of the image. The light quantity to be irradiated onto an image is preferably adjusted to be lower than 350 mJ/cm$^2$ in order to limit the irradiation of the ink droplets with radiation heat.

In order to prevent combining of neighboring ink droplets, the light irradiation for ink droplets is preferably performed within 10 seconds, preferably within 0.001 second to 5 seconds, and more preferably within 0.01 second to 2 seconds after the ink droplets are attached to the recording medium. The light irradiation is preferably performed after discharging the ink droplets from all inkjet recording heads that are accommodated in a head carriage.

Inkjet Recording Apparatus

The image forming method according to an embodiment can be carried out by using an inkjet recording apparatus of photocurable inkjet type. The inkjet recording apparatus of a photocurable inkjet type includes line recording type (single pass recording type) and serial recording type. Although it may be suitably selected depending on desired resolution or recording speed, the line recording (single pass recording type) is preferred from the viewpoint of high speed recording.

Figure 1B:
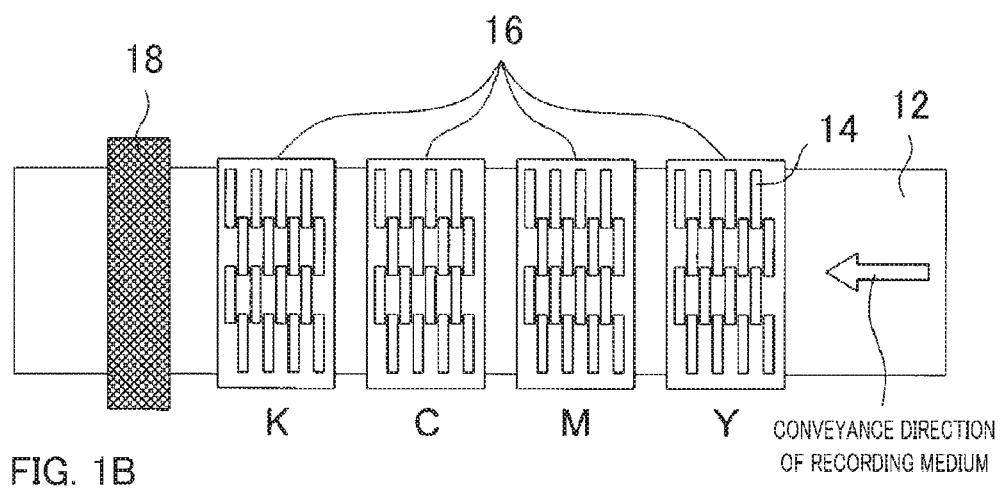

FIGS. 1A and 1B illustrate examples of the configuration of main parts of an inkjet recording apparatus of line recording type. FIG. 1A is a side view and FIG. 1B is a top view.

As illustrated in FIGS. 1A and 1B, inkjet recording apparatus 10 has head carriage 16 for accommodating a plurality of inkjet recording head 14, ink channel 30 connected to head carriage 16, ink tank 31 for storing the ink to be fed via ink channel 30, and Light irradiation section 18 for covering ink tank 31 and the entire width of recording medium 12 and also arranged at a downstream side of head carriage 16 (conveyance direction of the recording medium), and temperature control section 19 installed on a backside of recording medium 12.

Head carriage 16 is fixedly arranged so as to cover the entire width of recording medium 12 and accommodates a plurality of inkjet recording heads 14 that are installed for each color. Inkjet recording head 14 is designed to receive ink. For example, an ink can be supplied directly from a non-illustrated ink cartridge or the like that is added in a freely-mountable manner to inkjet recording apparatus 10 or by non-illustrated means for ink supply.

A plurality of inkjet recording heads 14 is installed for each color in the conveyance direction of recording medium 12. The number of inkjet recording heads 14 that is arranged in the conveyance direction of recording medium 12 is determined based on the nozzle density of inkjet recording head 14 and the resolution of a printed image. For example, when an image having the resolution of 1440×1440 dpi is formed by using inkjet recording head 14 with a drop volume of 2 pl and a nozzle density of 360 dpi, four of inkjet recording head 14 can be arranged in a staggered manner relative to the conveyance direction of recording medium 12. Further, when an image having the resolution of 720×720 dpi is formed by using inkjet recording head 14 with a drop volume of 6 pl and a nozzle density of 360 dpi, two of inkjet recording head 14 can be arranged in a staggered manner. As described herein, dpi represents the number of liquid droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink present in ink tank 31, ink channel 30, head carriage 16, and inkjet recording head 14 is heated to a predetermined temperature to maintain the gel state.

Light irradiation section 18 covers the entire width of recording medium 12 and it is arranged at a downstream side of head carriage 16 relative to the conveyance direction of the recording medium. Further, Light irradiation section 18 irradiates, with light, the liquid droplets which have been discharged from inkjet recording head 14 and landed on recording medium 12 so as to cure the liquid droplets.

Temperature control section 19 is installed on a backside of recording medium 12 and it maintains recording medium 12 at a pre-determined temperature. Temperature control section 19 can be various heaters or the like, for example.

Hereinafter, the image forming method using inkjet recording apparatus 10 of a line recording type is described. Recording medium 12 is conveyed to a region between head carriage 16 of inkjet recording apparatus 10 and temperature control section 19. Meanwhile, recording medium 12 is adjusted to a predetermined temperature by temperature control section 19. Subsequently, the ink droplets at a high temperature are discharged from inkjet recording head 14 of head carriage 16 and attached to (landed on) recording medium 12. Further, the ink droplets attached to recording medium 12 are cured by irradiation with light using Light irradiation section 18.

The total film thickness of the ink droplet after curing is preferably from 2 to 25 μm. The term "total film thickness of the ink droplet" refers to a maximum value of the film thickness of the ink droplet drawn on a recording medium.

Figure 2:
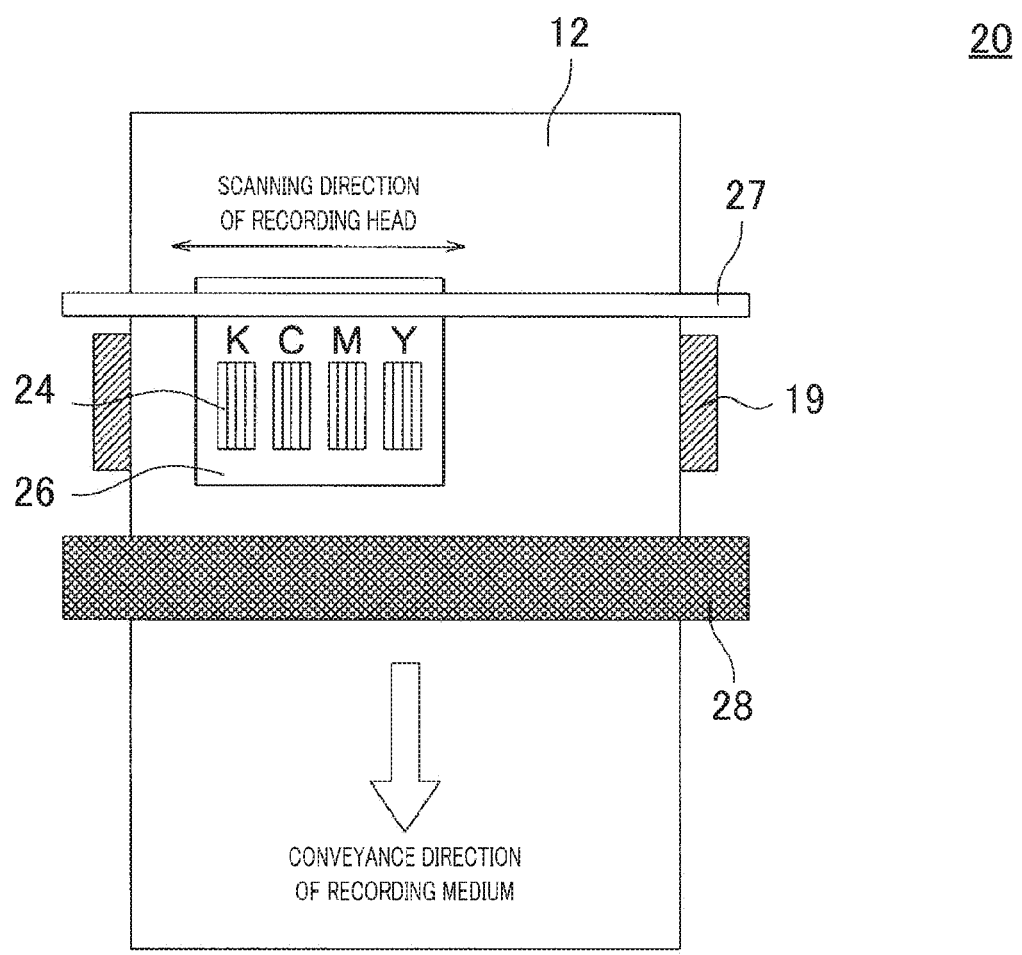
FIG. 2 illustrates an example of the configuration of main parts of an inkjet recording apparatus of serial recording type.

FIG. 2 is a diagram illustrating an example of the configuration of main parts of an inkjet recording apparatus of a serial recording type. As illustrated in FIG. 2, inkjet recording apparatus 20 can be configured in the same manner as that depicted in FIGS. 1A and 1B except that it has head carriage 26 which has a width narrower than the entire width of the recording medium and accommodates a plurality of inkjet recording heads 24 instead of head carriage 16, and guide section 27 for operating head carriage 26 in the width direction of recording medium 12.

In inkjet recording apparatus 20 of serial recording type, head carriage 26 discharges the ink droplets from inkjet recording head 24 accommodated in head carriage 26 while moving along guide section 27 in the width direction of recording medium 12. Once head carriage 26 moves completely in the width direction of recording medium 12 (for each pass), recording medium 12 is delivered in the conveyance direction. Except those operations, the image is recorded in almost the same manner as inkjet recording apparatus 10 of a line recording type that is described above.

EXAMPLES

Hereinafter, the present invention will be described specifically with reference to Examples, but the present invention is not limited to these.

<<Preparation of Pigment Dispersions>>

A pigment dispersion was prepared according to the following procedure. The following two compounds were put into a stainless steel beaker, heated, mixed and dissolved for 1 hour while being heated at 65° C. on a hot plate.

Ajisper PB824 (manufactured by Ajinomoto Fine-Techno Co., Inc.) 9 parts by weight Tripropylene glycol diacrylate (M-200 manufactured by Toagosei Co., Ltd.) 71 parts by weight After cooling to room temperature, 20 parts by weight of one of the pigments described below was added, and put and sealed together with 200 g of zirconia beads having a diameter of 0.5 mm into a glass bottle. After dispersed for the time period described below using a paint shaker, the zirconia beads were removed.

Pigment 1: Pigment Black 7 (manufactured by Mitsubishi Chemical Company, #52) 5 hours Pigment 2: Pigment Blue 15:4 (manufactured by Dainichiseika Colour & Chemicals Mfg. Co., Ltd., Chromo Fine Blue 6332JC) 5 hours Pigment 3: Pigment Red 122 (manufactured by Dainichiseika Colour & Chemicals Mfg. Co., Ltd., Chromo Fine Red 6112JC) 8 hours Pigment 4: Pigment Yellow 150 (manufactured by LANXESS, E4GN-GT CH20015) 8 hours <<Preparation of Ink Composition>>

Inks of Examples and Comparative Examples were prepared using the following components.

(Curable Monomer)

Polyethylene glycol diacrylate (NKester A-400, manufactured by Shin-Nakamura Chemical Co., Ltd.), 6EO modified trimethylol propane triacrylate (SR499, manufactured by Sartomer Company), 4EO modified pentaerythritol tetraacrylate (SR494, manufactured by Sartomer Company), 3PO modified trimethylolpropane triacrylate (Miramer M360, Manufactured by Miwon, C log P=4.90), NKester A-DCP (manufactured by Shin-Nakamura Chemical Co., Ltd., C log P=4.69), NKester DOD-N (manufactured by Shin-Nakamura Chemical Co., Ltd., C log P=5.75).

(Curable Oligomer)

Aliphatic urethane hexaacrylate (Etercure6147, manufactured by Eternal Chemical Co., Ltd., viscosity at 25° C.: from 5,000 to 6,000 mPa·s, number of functional groups: 6, and Tg: 85.5° C.)

Epoxy modified acrylate (Etercure6234, manufactured by Eternal Chemical Co., Ltd., viscosity at 25° C.: from 3,500 to 5,000 mPa·s, number of functional groups: 2, and Tg: 80.4° C.)

Hyperbranched polyester acrylate (Etercure6361-100, manufactured by Eternal Chemical Co., Ltd., viscosity at 25° C.: from 150 to 250 mPa·s, number of functional groups: 8, and Tg: 51.6° C.)

Hyperbranched polyester acrylate (Etercure6362-100, manufactured by Eternal Chemical Co., Ltd., viscosity at 25° C.: from 400 to 800 mPa·s, number of functional groups: from 12 to 15, and Tg: 70° C.)

Polyester acrylate oligomer (CN2303, manufactured by Sartomer Company, viscosity at 25° C.: 350 mPa·s, number of functional groups: 6, and Tg: 104° C.)

Aliphatic polyester acrylate (CN2273, manufactured by Sartomer Company, viscosity at 25° C.: 100 mPa·s, number of functional groups: 2, and Tg: −45° C.)

Aromatic polyester acrylate (CN2285, manufactured by Sartomer Company, viscosity at 25° C.: 350 mPa·s, number of functional groups: 1, and Tg: 32° C.)

Amine acrylate (CN371, manufactured by Sartomer Company, viscosity at 25° C. of 1,488 mPa·s, number of functional groups: 2, and Tg: −39° C.)

(Gelling Agent)

Stearyl stearate and behenyl behenate were mixed and used.

Stearyl stearate (EXCEPARL SS, manufactured by Kao Corporation), (UNISTAR M-9676, manufactured by NOF Corporation), (EMALEX CC-18, manufactured by NIHON EMULSION Co., Ltd.), (AMREPS SS, manufactured by KOKYU ALCOHOL KOGYO CO., LTD.)

Behenyl behenate (UNISTAR M-2222SL, manufactured by NOF Corporation)

(Photopolymerization Initiator)

DAROCURE TPO (manufactured by BASF)

ITX (manufactured by DKSH)

(Surfactant)

KF-352 (manufactured by Shin-Etsu Chemical Company)

(Sensitization Promoter)

KayacureEPA (manufactured by Nippon Kayaku Co., Ltd.)

According to the ink compositions described in Table 2 and Table 3, the indicated amounts of the components and the above pigment dispersion were mixed and stirred under heating at 80° C. Under heating, the obtained solution was filtered through a 3 μm TEFLON (registered trademark) membrane filter manufactured by Advantec MFS, Inc. Thereafter, the evaluation of the image was performed according to the evaluation criteria described below.

TABLE 2

| | | Ink composition | | | | | | | |
|---|---|---|---|---|---|---|---|---|---|
| | | 1 Example | 2 Example | 3 Example | 4 Example | 5 Comparative Example | 6 Comparative Example | 7 Comparative Example | 8 Example |
| Pigment dispersion | Pigment dispersion 1 | 12.5 | 12.5 | 12.5 | 12.5 | 12.5 | 12.5 | 12.5 | 12.5 |
| Polymerizable compound | NKester A-400 | 30.4 | 30.4 | 20.4 | 15.4 | 10.4 | 32.9 | 27.9 | 25.4 |
| | SR499 | 20.0 | 20.0 | 20.0 | 20.0 | 20.0 | 20.0 | 20.0 | 20.0 |
| | SR494 | 15.0 | 15.0 | 15.0 | 15.0 | 15.0 | 15.0 | 15.0 | 15.0 |
| | Miramer M360 (Manufactured by Miwon, ClogP = 4.90) | 5.0 | 5.0 | 5.0 | 5.0 | 5.0 | 5.0 | 5.0 | 5.0 |
| | Nkester A-DCP (Manufactured by Shin-Nakamura Chemical Co., Ltd., ClogP = 4.69) | | | | | | | | |
| | Nkester DOD-N (Manufactured by Shin-Nakamura Chemical Co., Ltd., ClogP = 5.75) | | | | | | | | |
| Oligomer | CN2303 | 5.0 | | | | | | | |
| | Etercure6361-100 | | 5.0 | 15.0 | 20.0 | 25.0 | 2.5 | 2.5 | 5.0 |
| | Etercure6362-100 | | | | | | | | |
| | Etercure6147 | | | | | | | | |
| | Etercure6234 | | | | | | | | |
| | CN371 | | | | | | | | |
| | CN2285 | | | | | | | | |
| | CN2273 | | | | | | | 5.0 | 5.0 |
| Surfactant | KF-352 | 0.1 | 0.1 | 0.1 | 0.1 | 0.1 | 0.1 | 0.1 | 0.1 |
| Photoinitiator | DAROCURE TPO | 5.0 | 5.0 | 5.0 | 5.0 | 5.0 | 5.0 | 5.0 | 5.0 |
| Photoinitiator | ITX | 2.0 | 2.0 | 2.0 | 2.0 | 2.0 | 2.0 | 2.0 | 2.0 |
| Sensitization promoter | KayacureEPA | 2.0 | 2.0 | 2.0 | 2.0 | 2.0 | 2.0 | 2.0 | 2.0 |
| Gelling agent | Stearyl stearate | 2.0 | 2.0 | 2.0 | 2.0 | 2.0 | 2.0 | 2.0 | 2.0 |
| | Behenyl behenate | 1.0 | 1.0 | 1.0 | 1.0 | 1.0 | 1.0 | 1.0 | 1.0 |

| | | Ink composition | | | | | | |
|---|---|---|---|---|---|---|---|---|
| | | 9 Example | 10 Example | 11 Example | 12 Example | 13 Comparative Example | 14 Comparative Example | 15 Comparative Example |
| Pigment dispersion | Pigment dispersion 1 | 12.5 | 12.5 | 12.5 | 12.5 | 12.5 | 12.5 | 12.5 |
| Polymerizable compound | NKester A-400 | 15.4 | 30.4 | 30.4 | 30.4 | 30.4 | 30.4 | 30.4 |
| | SR499 | 20.0 | 20.0 | 20.0 | 20.0 | 20.0 | 20.0 | 20.0 |
| | SR494 | 15.0 | 15.0 | 15.0 | 15.0 | 15.0 | 15.0 | 15.0 |

TABLE 2-continued

|  |  |  |  |  |  |  |  |  |
|---|---|---|---|---|---|---|---|---|
|  | Miramer M360 (Manufactured by Miwon, ClogP = 4.90) | 5.0 | 5.0 | 5.0 | 5.0 | 5.0 | 5.0 | 5.0 |
|  | Nkester A-DCP (Manufactured by Shin-Nakamura Chemical Co., Ltd., ClogP = 4.69) |  |  |  |  |  |  |  |
|  | Nkester DOD-N (Manufactured by Shin-Nakamura Chemical Co., Ltd., ClogP = 5.75) |  |  |  |  |  |  |  |
| Oligomer | CN2303 |  |  |  |  |  |  |  |
|  | Etercure6361-100 | 15.0 |  |  |  |  |  |  |
|  | Etercure6362-100 |  | 5.0 |  |  |  |  |  |
|  | Etercure6147 |  |  |  | 5.0 |  |  |  |
|  | Etercure6234 |  |  | 5.0 |  |  |  |  |
|  | CN371 |  |  |  |  | 5.0 |  |  |
|  | CN2285 |  |  |  |  |  | 5.0 |  |
|  | CN2273 | 5.0 |  |  |  |  |  | 5.0 |
| Surfactant | KF-352 | 0.1 | 0.1 | 0.1 | 0.1 | 0.1 | 0.1 | 0.1 |
| Photoinitiator | DAROCURE TPO | 5.0 | 5.0 | 5.0 | 5.0 | 5.0 | 5.0 | 5.0 |
| Photoinitiator | ITX | 2.0 | 2.0 | 2.0 | 2.0 | 2.0 | 2.0 | 2.0 |
| Sensitization promoter | KayacureEPA | 2.0 | 2.0 | 2.0 | 2.0 | 2.0 | 2.0 | 2.0 |
| Gelling agent | Stearyl stearate | 2.0 | 2.0 | 2.0 | 2.0 | 2.0 | 2.0 | 2.0 |
|  | Behenyl behenate | 1.0 | 1.0 | 1.0 | 1.0 | 1.0 | 1.0 | 1.0 |

TABLE 3

|  |  | Ink composition | | | | | |
|---|---|---|---|---|---|---|---|
|  |  | 16 Example | 17 Example | 18 Example | 19 Example | 20 Example | 21 Example |
| Pigment dispersion | Pigment dispersion 1 | 12.5 | 12.5 | 12.5 | 12.5 | 12.5 | 12.5 |
| Polymerizable compound | NKester A-400 | 15.4 | 15.4 | 15.4 | 15.4 | 22.4 | 22.4 |
|  | SR499 | 20.0 | 20.0 | 20.0 | 20.0 | 20.0 | 20.0 |
|  | SR494 | 15.0 | 15.0 | 15.0 | 15.0 | 15.0 | 15.0 |
|  | Miramer M 360 (Manufactured by Miwon, ClogP = 4.90) | 20.0 | 20.0 |  |  |  |  |
|  | Nkester A-DCP (Manufactured by Shin-Nakamura Chemical Co., Ltd., ClogP = 4.69) |  |  | 20.0 | 20.0 |  |  |
|  | Nkester DOD-N (Manufactured by Shin-Nakamura Chemical Co., Ltd., ClogP = 5.75) |  |  |  |  | 13.0 | 13.0 |
| Oligomer | CN2303 | 5.0 |  | 5.0 |  |  |  |
|  | Etercure6361-100 |  | 5.0 |  | 5.0 |  |  |
|  | Etercure6362-100 |  |  |  |  | 5.0 |  |
|  | Etercure6147 |  |  |  |  |  | 5.0 |
|  | Etercure6234 |  |  |  |  |  |  |
|  | CN371 |  |  |  |  |  |  |
|  | CN2285 |  |  |  |  |  |  |
|  | CN2273 |  |  |  |  |  |  |
| Surfactant | KF-352 | 0.1 | 0.1 | 0.1 | 0.1 | 0.1 | 0.1 |
| Photoinitiator | DAROCURE TPO | 5.0 | 5.0 | 5.0 | 5.0 | 5.0 | 5.0 |
| Photoinitiator | ITX | 2.0 | 2.0 | 2.0 | 2.0 | 2.0 | 2.0 |
| Sensitization promoter | KayacureEPA | 2.0 | 2.0 | 2.0 | 2.0 | 2.0 | 2.0 |
| Gelling agent | Stearyl stearate | 2.0 | 2.0 | 2.0 | 2.0 | 2.0 | 2.0 |
|  | Behenyl behenate | 1.0 | 1.0 | 1.0 | 1.0 | 1.0 | 1.0 |

<<Inkjet Image Forming Method>>

Each of the ink compositions prepared as described above was loaded in an inkjet recording apparatus equipped with an inkjet recording head equipped with piezo type inkjet nozzles. Using this apparatus, image recording was performed on a kikuban-sized coated paper (OK OVERCOAT, manufactured by Oji Paper Co., Ltd.) and high quality paper (OK PRINCE HIGH QUALITY, manufactured by Oji Paper Co., Ltd.). Meanwhile, the conveyance speed of the recording medium was 60 m/s.

The ink supplying system is composed of an ink tank, an ink channel, a sub-ink tank immediately before the inkjet recording head, filter-attached piping, and a piezo head. The area from the entire tank to the head portion was warmed to 100° C. by heating. At the piezo head, a voltage was applied such that liquid droplets of 2 μl would be obtained, and the discharge was made by using four heads at a resolution of 360 dpi for each color. In this way, a solid image of monochrome K at 1440×1440 dpi was formed.

After printing, curing was performed with an LED lamp (395 nm, 8 W/cm$^2$, water cooled unit) manufactured by Phoseon Technology, Inc. The distance from the pipe surface of the LED lamp to the recording medium was 5 mm (width of irradiation in the conveyance direction: 20 mm)

<<Evaluations>>

<Ink Ejection Property>

After performing continuous ejection for 30 minutes using the above inkjet recording apparatus, the occurrence of nozzle clogging was visually inspected, and ink ejection stability was evaluated according to the following criteria.

A: No nozzle clogging and no satellites after continuous ejection for 30 minutes.

B: Satellites are formed or four or less of the nozzles are clogged after continuous ejection for 30 minutes.

C: Five or more of the nozzles are clogged after continuous ejection for 30 minutes.

<Tack Feel>

The ink after curing of each sample was touched by a finger and the tack feel was evaluated according to the following criteria.

A: No sticky feel

B: Slightly sticky; fingerprints remained.

<Hardness (Pencil Hardness)>

For image printouts of each sample on OK TOP paper, a 100% coverage area of the 10th sheet was left to stand for 24 hours in an environment at 25° C. and 60% RH, and then the pencil hardness of the surface was measured according to JIS-K-5400. Evaluation of the hardness was performed according to the following criteria.

A: Pencil hardness of 2H or higher

C: Pencil hardness of H or lower

<Bending Resistance>

For image printouts of each sample on OK TOP paper, a 100% coverage area of the 10th sheet was left to stand for 24 hours at 25° C. and 60% RH, and then the paper sheet was folded into halves. The evaluation of bending resistance was performed according to the following criteria.

A: The image film is not ruptured

C: The image film is ruptured at the folded portion

Results of the image forming evaluation are shown in Table 4 and Table 5.

TABLE 4

| | | Ink composition | | | | | | | |
|---|---|---|---|---|---|---|---|---|---|
| | | 1 Example | 2 Example | 3 Example | 4 Example | 5 Comparative Example | 6 Comparative Example | 7 Comparative Example | 8 Example |
| Evaluation | Ejection property | A | A | A | A | B | A | A | A |
| | Tack feel | A | A | A | A | A | B | A | A |
| | Pencil hardness | A | A | A | A | A | C | C | A |
| | Bending resistance | A | A | A | A | C | A | A | A |

| | | Ink composition | | | | | | |
|---|---|---|---|---|---|---|---|---|
| | | 9 Example | 10 Example | 11 Example | 12 Example | 13 Comparative Example | 14 Comparative Example | 15 Comparative Example |
| Evaluation | Ejection property | A | A | A | A | A | A | A |
| | Tack feel | A | A | A | A | A | B | B |
| | Pencil hardness | A | A | A | A | C | C | C |
| | Bending resistance | A | A | A | A | A | A | A |

TABLE 5

| | | Ink composition | | | | | |
|---|---|---|---|---|---|---|---|
| | | 16 Example | 17 Example | 18 Example | 19 Example | 20 Example | 21 Example |
| Evaluation | Ejection property | A | A | A | A | A | A |
| | Tack feel | A | A | A | A | A | A |
| | Pencil hardness | A | A | A | A | A | A |
| | Bending resistance | A | A | A | A | A | A |

The inks of Examples (ink compositions 1 to 4, 8 to 12, and 16 to 21) exhibited good tack feel and pencil hardness even under irradiation of light with low illuminance.

On the other hand, the inks of Comparative Examples (ink compositions 13 to 15) containing a curable oligomer with a glass transition temperature (Tg) of lower than 40° C. exhibited poor pencil hardness. This is considered to be due to a reduction in the hardness of the cured product caused by increased molecular mobility of the curable oligomer due to a low glass transition temperature (Tg).

Further, the ink (ink composition 5) with a glass transition temperature (Tg) of at least 40° C. and containing an excessive amount of polyfunctional curable oligomer exhibited poor bending resistance. This is considered to be due to excessive curing of the excess oligomer which resulted in the formed image being brittle.

On the other hand, the inks (ink compositions 6 and 7) with a glass transition temperature (Tg) of at least 40° C. and containing an excessively small amount of the polyfunctional curable oligomer exhibited poor pencil hardness. A possible cause of this is that since the content of the polyfunctional curable oligomer is low, the crosslinking density of the cured product decreased resulting in a reduction in the hardness of the cured product.

The inks of Examples (ink compositions 16 to 21) exhibited good gelation solubility.

Further, pigment dispersion 1 (12.5 parts by weight) was replaced with pigment dispersion 2 (12.5 parts by weight), pigment dispersion 3 (21.0 parts by weight) or pigment dispersion 4 (15.0 parts by weight) and NKester was added as a balance to prepare 100 parts by weight of C, M or Y ink. In addition to C, M, and Y inks, K ink was used to prepare an ink set of four color inks.

<<Inkjet Image Forming Method>>

The ink compositions prepared as described above were loaded in an inkjet recording apparatus equipped with inkjet recording heads having piezo type inkjet nozzles. Using the inkjet recording apparatus, image recording was performed on a kikuban-sized coated paper (OK OVERCOAT, manufactured by Oji Paper Co., Ltd.) and wood free paper (OK Prince Joshitsu, manufactured by Oji Paper Co., Ltd.). The conveyance speed of the recording medium was 30 m/s.

The ink supplying system was composed of an ink tank, an ink channel, a sub-ink tank immediately before the inkjet recording head, filter-attached piping, and a piezo head. The area from the entire tank to the head portion was warmed to 100° C. by heating. At the piezo head, a voltage was applied such that liquid droplets of 2 pl would be obtained, and the discharge was made by using four heads at a resolution of 360 dpi for each color. Thus, a solid image of monochrome YMCK at 1440×1440 dpi and a solid image of RGB secondary and tertiary colors of K (Y+M+C) were formed.

After printing, curing was performed using an LED lamp (395 nm, 8 W/cm$^2$, water cooled unit) manufactured by Phoseon Technology, Inc. The distance from the pipe surface of the LED lamp to the recording medium was 5 mm (width of irradiation in the conveyance direction: 20 mm)

<<Evaluations>>

<Hardness (Pencil Hardness)>

Evaluation criteria are same as that for the above-described solid image of monochrome K.

<Shrinkage by Curing>

Deformation of paper at a boundary region between solid image portion and non-image portion of the single color, secondary color, and tertiary color K (Y, M, and C, each at 100%) was visually evaluated.

A: No deformation of paper is observed.
B: Slight deformation is observed in at the boundary between the tertiary color K and non-image portion.
C: Deformation is observed at the boundary between the secondary color K and non-image portion.

<Image Quality (Blank)>

For the solid image printouts of the ink sample of Examples and Comparative

Examples, the presence of blank (non-printed part caused by combining of dots) was visually inspected.

A: No blank
B: 1 or 2 blank spots, but no problem for practical use.
C: Many blanks <Dissolution Stability of Gelling Agent>

Dissolution state after keeping for 4 hours at 100° C. was visually observed.

A: No separation or precipitation
B: Slightly white and cloudy appearance.
C: Oil droplets gathered on the surface (layer separation occurred).

Results of the image forming evaluation are shown in Table 6 and Table 7.

TABLE 6

| | | Ink set | | | | | | |
|---|---|---|---|---|---|---|---|---|
| | | 1 Example | 2 Example | 3 Example | 4 Example | 5 Comparative Example | 6 Comparative Example | 7 Comparative Example | 8 Example |
| Evaluation | Pencil hardness | A | A | A | A | A | C | C | A |
| | Shrinkage by curing | A | A | B | B | C | A | A | A |
| | Solubility of gelling agent at 100° C. for 4 hrs | B | B | B | B | B | B | B | B |
| | Image quality (blank) | B | B | B | B | B | B | B | B |

| | | Ink set | | | | | | |
|---|---|---|---|---|---|---|---|---|
| | | 9 Example | 10 Example | 11 Example | 12 Example | 13 Comparative Example | 14 Comparative Example | 15 Comparative Example |
| Evaluation | Pencil hardness | A | A | A | A | C | C | C |

TABLE 6-continued

| | | | | | | | |
|---|---|---|---|---|---|---|---|
| Shrinkage by curing | A | A | A | A | A | A | A |
| Solubility of gelling agent at 100° C. for 4 hrs | B | B | B | B | B | B | B |
| Image quality (blank) | B | B | B | B | B | B | B |

TABLE 7

| | | Ink set | | | | | |
|---|---|---|---|---|---|---|---|
| | | 16 Example | 17 Example | 18 Example | 19 Example | 20 Example | 21 Example |
| Evaluation | Pencil hardness | A | A | A | A | A | A |
| | Solubility of gelling agent at 100° C. for 4 hrs | A | A | A | A | A | A |
| | Image quality (blank) | A | A | A | A | B | B |

The inks of Examples (ink compositions 1 to 4 and 8 to 12) exhibited good pencil hardness and shrinkage even by irradiation with light with low illuminance On the other hand, inks (ink compositions 13 to 15) of Comparative Examples containing a curable oligomer with a glass transition temperature (Tg) of lower than 40° C. exhibited poor pencil hardness. This is considered to be due to a reduction in the hardness of the cured product caused by increased molecular mobility of the curable oligomer due to a low glass transition temperature (Tg).

Further, the ink set (ink set 5) with a glass transition temperature (Tg) of at least 40° C. and containing a polyfunctional curable oligomer in an excess amount exhibited poor bending resistance. This is considered to be due to deformation of the paper sheet due to excessively high crosslinking density of the cured product.

On the other hand, the inks (ink set 6 and 7) with a glass transition temperature (Tg) of at least 40° C. and containing an excessively small amount of the polyfunctional curable oligomer exhibited poor pencil hardness. This is considered to be due to a reduction in the crosslinking density of the cured product due to low oligomer content, which caused a reduction in the hardness of the image.

INDUSTRIAL APPLICABILITY

According to the present invention, it is possible to provide, regarding an inkjet ink containing a gelling agent, a photocurable inkjet ink capable of forming stably an image with high scratch resistance (hardness) even when a light source with relatively low illuminance is used, and an image forming method using the same.

The present application claims the priority based on prior Japanese patent applications filed by the same applicant, that is, Japanese Patent Application No. 2011-269458 filed Dec. 8, 2011 and Japanese Patent Application No. 2012-015264 filed Jan. 27, 2012), the entire contents of including the specification are incorporated herein by reference.

REFERENCE SIGNS LIST 10, 20 Inkjet recording apparatus
12 Recording medium
14, 24 Inkjet recording head
16, 26 Head carriage
18, 28 Light irradiation section
19 Temperature control section
27 Guide section
30 Ink channel
31 Ink tank

The invention claimed is:

1. A photocurable inkjet ink comprising a curable monomer, a photopolymerization initiator, a gelling agent, a colorant, and a curable olgomer, wherein
the number of a functional group of the curable oligomer is in a range of from 2 to 20, and a glass transition temperature of the curable oligomer is 40° C. or higher; and
a content of the curable oligomer is from 4 to 20 wt % relative to a total weight of the ink.

2. The photocurable inkjet ink according to claim 1, wherein the number of the functional group of the curable oligomer is from 6 to 20.

3. The photocurable inkjet ink according to claim 1, wherein a viscosity at 25° C. of the curable oligomer is from 100 to 10,000 mPa·s.

4. The photocurable inkjet ink according to claim 1, wherein the curable oligomer is either a dendrimer or a hyperhranched oligomer.

5. The photocurable inkjet ink according to claim 1, further comprising a (meth)acrylate compound having a ClogP value in a range of from 4.0 to 7.0.

6. The photocurable inkjet ink according to claim 5, wherein a content of the (meth)acrylate compound having a ClogP value in a range of from 4.0 to 7.0 is from 10 to 40 wt % relative to the total weight of the ink.

7. The photocurable inkjet ink according to claim 5, wherein a molecular weight of the (meth)acrylate compound having a ClogP value in a range of from 4.0 to 7.0 is in a range of from 280 to 1,500.

8. The photocurable inkjet ink according to claim 1, wherein. the (meth)acrylate compound having a CloqP value in a range of from 4.0 to 7.0 is at least one (meth)acrylate compound of the following (1) and (2):
(1) a (meth)acrylate compound with a functionality of 3 or more, the (meth)acrylate compound having a structure represented by $(-C(CH_3)H-CH_2-O-)_m$ (where m is an integer of from 3 to 14) in a molecule, and
(2) a (meth)acrylate compound with a functionality of 2 or more, the (meth)acrylate compound having a cyclic structure in a molecule.

9. The photocurable inkjet ink according to claim. 1, wherein the gelling agent is at least one compound of the compounds represented by the following Formulas (G1) and (G2):

$$R1\text{-}CO\text{—}R2 \qquad \text{Formula (G1)}$$

and $$R3\text{-}COO\text{—}R4 \qquad \text{Formula (G2)}$$

where R1 to R4 each independently represent an alkyl chain which has a linear chain moiety with 12 or more carbon atoms and also may have a branch.

10. The photocurable inkjet ink according to claim 1, wherein the colorant is a black pigment.

11. An image forming method comprising:
    attaching ink droplets of the photocurable inkjet ink according to claim 1 to a recording medium by discharging the ink droplets from an inkjet recording head; and
    curing the ink droplets landed on the recoding medium by irradiation with light having a wavelength of from 360 to 410 nm using an LED light source.

12. The image forming method. according to claim. 11, wherein a peak illuminance of the LED light source is 3 $W/cm^2$ or higher.

13. The image forming method according to claim 11, wherein a temperature of the recording medium when the photocurable inkjet ink is landed on the recording medium is from 10 to 20° C. lower than a sol-gel phase transition temperature of the ink.

14. The photocurable inkjet ink according to claim 1, wherein the curable oligomer is radiation curable.

15. The photocurable inkjet ink according to claim 1, wherein the ink undergo sol-gel phase change by temperature.

* * * * *